(12) United States Patent
Lopez et al.

(10) Patent No.: US 8,347,825 B2
(45) Date of Patent: Jan. 8, 2013

(54) SYSTEMS, METHODS, AND APPARATUS FOR PET WASTE DISPOSAL

(76) Inventors: Sammy Lopez, Charlotte, NC (US); Nicole Lopez, Charlotte, NC (US)

( * ) Notice: Subject to any disclaimer, the term of this patent is extended or adjusted under 35 U.S.C. 154(b) by 18 days.

(21) Appl. No.: 12/880,620

(22) Filed: Sep. 13, 2010

(65) Prior Publication Data

US 2011/0290188 A1    Dec. 1, 2011

Related U.S. Application Data

(60) Provisional application No. 61/348,395, filed on May 26, 2010.

(51) Int. Cl.
*A01K 27/00* (2006.01)
*A01K 7/00* (2006.01)

(52) U.S. Cl. .......... 119/795; 119/61.56; 119/72

(58) Field of Classification Search .......... 119/61.5, 119/61.56, 61.57, 72, 794, 796, 61.54, 792, 119/795, 797, 798
See application file for complete search history.

(56) References Cited

U.S. PATENT DOCUMENTS

| | | | |
|---|---|---|---|
| 2,222,409 A | 11/1940 | Gottlieb |
| 2,314,504 A | 3/1943 | Lifchultz |
| 2,919,676 A | 1/1960 | Schneider |
| 3,693,596 A | 9/1972 | Croce et al. |
| 3,776,198 A | 12/1973 | Gehrke |
| 3,853,283 A | 12/1974 | Croce et al. |
| 4,018,189 A | 4/1977 | Umphries et al. |
| 4,165,713 A | 8/1979 | Brawner et al. |
| 4,197,817 A | 4/1980 | Crutchfield |
| 4,202,510 A | 5/1980 | Stanish |
| 4,269,150 A | 5/1981 | McCarthy |
| 4,501,230 A | 2/1985 | Talo |
| 4,796,566 A | 1/1989 | Daniels |
| 4,887,551 A | 12/1989 | Musetti |
| 5,377,626 A | 1/1995 | Kilsby |
| 5,423,494 A | 6/1995 | Kondo |
| 5,636,592 A | 6/1997 | Wechsler |
| 5,738,039 A | 4/1998 | Berman et al. |
| 6,016,772 A | 1/2000 | Noyes |
| 6,516,748 B1 | 2/2003 | Jackson |
| 7,044,080 B2 | 5/2006 | Rabello |
| 7,690,329 B2 | 4/2010 | Parks |

(Continued)

OTHER PUBLICATIONS

Information Disclosure Statement (IDS) Letter Regarding Common Patent Application(s), dated xx.

*Primary Examiner* — Rob Swiatek
*Assistant Examiner* — Lisa Tsang
(74) *Attorney, Agent, or Firm* — Tillman Wright, PLLC; Chad D. Tillman; Jeremy C. Doerre

(57) ABSTRACT

A leash module including a retention opening configured to receive and retain a used pet waste bag that has been closed via a tied knot, and a bowl portion configured to receive and retain water for drinking by a pet. The leash module is configured to be removably coupled to a leash assembly. The retention opening includes a bag receipt opening sized and dimensioned to allow for insertion of the tied knot of the used pet waste bag, and a bag retention opening extending from the bag receipt opening, the bag retention opening being narrower than the bag receipt opening and being sized and dimensioned to prevent passage of the tied knot of the used pet waste bag.

19 Claims, 17 Drawing Sheets

U.S. PATENT DOCUMENTS

| | | | |
|---|---|---|---|
| 7,789,042 B1* | 9/2010 | Dinon | 119/61.5 |
| 2006/0219182 A1 | 10/2006 | Rabello | |
| 2008/0000431 A1* | 1/2008 | Longo | 119/795 |
| 2010/0018468 A1 | 1/2010 | Rabello | |
| 2010/0043721 A1* | 2/2010 | Cigan | 119/796 |
| 2011/0197820 A1* | 8/2011 | Goldy et al. | 119/61.5 |

* cited by examiner

120

220

222

220

220

220

SYSTEMS, METHODS, AND APPARATUS FOR PET WASTE DISPOSAL

CROSS-REFERENCE TO RELATED APPLICATION

The present application is a U.S. nonprovisional patent application of, and claims priority under 35 U.S.C. §119(e) to, U.S. provisional patent application Ser. No. 61/348,395, filed May 26, 2010, which provisional patent application is incorporated by reference herein.

COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

BACKGROUND OF THE INVENTION

The present invention generally relates to systems, methods, and apparatus for pet owners.

The rapid increase of urban populations along with the increasing popularity of dogs and other pets has created, in at least some areas, a serious sanitary problem regarding the disposal of animal litter, and, in particular, canine litter. It is believed that the willingness of pet owners to retrieve and properly dispose of animal litter is related, in at least some cases, to the ease and convenience with which the litter may be handled in a clean and sanitary manner. While a number of devices have been proposed for disposing of animal litter, they have suffered from various shortcomings.

One commonly accepted method for collecting and storing animal litter until a proper disposal site can be found involves the use of a disposable plastic bag. Some pet owners simply place a plastic bag, such as a plastic grocery bag, in a clothing pocket for retrieval when needed. This method of collecting animal litter presupposes, however, that a pet owner will always have access to, and remember to grab, a plastic bag prior to walking his or her pet.

Pet owners commonly walk their pets utilizing pet leashes. Numerous types of pet leashes, e.g. retractable pet leashes, are known in the art. Exemplary such leashes are disclosed in: U.S. Pat. No. 2,222,409 to Gottlieb; U.S. Pat. No. 2,314,504 to Lifchultz; U.S. Pat. No. 2,919,676 to Schneider; U.S. Pat. No. 3,693,596 to Croce et al.; U.S. Pat. No. 3,776,198 to Gehrke; U.S. Pat. No. 3,853,283 to Croce et al.; U.S. Pat. No. 4,018,189 to Umphries et al.; U.S. Pat. No. 4,165,713 to Brawner et al.; U.S. Pat. No. 4,197,817 to Crutchfield; U.S. Pat. No. 4,202,510 to Stanish; U.S. Pat. No. 4,269,150 to McCarthy; U.S. Pat. No. 4,501,230 to Talo; U.S. Pat. No. 4,796,566 to Daniels; U.S. Pat. No. 4,887,551 to Musetti; U.S. Pat. No. 5,377,626 to Kilsby; U.S. Pat. No. 5,423,494 to Kondo; and U.S. Pat. No. 7,044,080 to Rabello. Each of these patents is hereby incorporated herein by reference.

Some have recognized the desirability of providing an easy way to carry pet waste bags when going for a walk utilizing a leash, e.g. a retractable leash. For example, U.S. Pat. No. 6,240,881 (which is hereby incorporated herein by reference) discloses a pet refuse bag dispenser integrally formed with, or removably connected to, a leash handle that provides access to a roll of plastic pet refuse bags. It is believed, however, that such a device does not provide a convenient way to transport pet waste once it is contained within a pet waste bag.

A need exists for improvement in pet waste disposal. This, and other needs, are addressed by one or more aspects of the present invention.

SUMMARY OF THE INVENTION

The present invention includes many aspects and features. Moreover, while many aspects and features relate to, and are described in, the context of pet waste disposal, the present invention is not limited to use only in this context, as will become apparent from the following summaries and detailed descriptions of aspects, features, and one or more embodiments of the present invention.

Accordingly, one aspect of the present invention relates to a leash assembly. The leash assembly includes a housing comprising a handle portion, and a leash at least partially contained within the housing, one end of the leash being secured within the housing. The housing includes a retention opening, the retention opening being configured to retain a used pet waste bag.

In a feature of this aspect of the invention, the retention opening includes a top bag receipt section and a bottom bag retention section.

In a feature of this aspect of the invention, the retention opening is configured to retain a used pet waste bag via engagement of a knot of the used pet waste bag with the bottom bag retention section.

In a feature of this aspect of the invention, the top bag receipt section is generally rectangular.

In a feature of this aspect of the invention, the top bag receipt section is generally rectangular with rounded corners.

In a feature of this aspect of the invention, the bottom bag retention section tapers to a point from where it meets the top bag receipt section.

In a feature of this aspect of the invention, the bottom bag retention section is generally triangular.

In a feature of this aspect of the invention, the leash assembly further comprises a used pet waste bag containing pet waste, the used pet waste bag being closed with a knot, wherein the used pet waste bag is secured to the housing via retention of the knot within the retention opening.

In a feature of this aspect of the invention, the leash assembly is configured for securement of a used pet waste bag via retention of a knot of a closed used pet waste bag within the retention opening.

Another aspect of the present invention relates to a leash assembly. The leash assembly includes a housing comprising a handle portion. The housing includes a dispensing opening and a retention opening. The leash assembly further includes a leash at least partially contained within the housing, one end of the leash being secured within the housing. The dispensing opening is configured to provide access to an unused pet waste bag contained within the housing, and the retention opening is configured to retain a used pet waste bag.

In a feature of this aspect of the invention, the dispensing opening is configured to allow for the insertion of an unused pet waste bag.

In a feature of this aspect of the invention, the retention opening is configured to allow for the insertion of an unused pet waste bag, and wherein an unused pet waste bag inserted via the retention opening is accessible via the dispensing opening.

In a feature of this aspect of the invention, a plurality of unused pet waste bags are retained within the housing.

In a feature of this aspect of the invention, a used pet waste bag is retained via the retention opening.

Another aspect of the present invention relates to a method of disposing of pet waste. The method includes walking a dog utilizing a leash assembly; removing a pet waste bag from the leash assembly, the pet waste bag having been contained within the leash assembly in an unused state and a storage configuration; transitioning the unused pet waste bag from the storage configuration to a use configuration; causing pet waste to be contained within the pet waste bag, thereby transitioning the pet waste bag from the unused state to a used state; closing the pet waste bag by tying a knot in the pet waste bag; and retaining the pet waste bag via engagement of the knot with a retention opening of the leash assembly.

In a feature of this aspect of the invention, the step of retaining the pet waste bag comprises inserting the knot within a bag receipt section of the retention opening; and effecting downward movement of the knot such that the knot is retained within a housing of the leash assembly by a bag retention section of the retention opening.

In a feature of this aspect of the invention, the bag retention section of the retention opening tapers to a point from the bag receipt section of the retention opening.

Another aspect of the present invention relates to a method of disposing of pet waste. The method includes walking a dog utilizing a leash assembly; causing pet waste to be contained within a pet waste bag, thereby transitioning the pet waste bag from an unused state to a used state; closing the pet waste bag by tying a knot in the pet waste bag; and retaining the pet waste bag via engagement of the knot with a retention opening of the leash assembly.

Another aspect of the present invention relates to a leash assembly. The leash assembly includes a leash band; and a connection mechanism disposed proximate an end of the leash band. The leash band includes a retention opening defined therethrough, the retention opening being configured to retain a used pet waste bag.

Another aspect of the present invention relates to a leash assembly as disclosed.

Another aspect of the present invention relates to a method as disclosed.

Another aspect of the present invention relates to an apparatus as disclosed.

Another aspect of the present invention relates to a system as disclosed.

Another aspect of the present invention relates to a leash module. The leash module includes a retention opening configured to receive and retain a used pet waste bag that has been closed via a knot, and a bowl portion configured to receive and retain water for drinking by a pet. The leash module is configured to be removably coupled to a leash assembly.

In a feature of this aspect, the leash module is configured to be removably coupled to a leash assembly via snap-fit engagement.

In a feature of this aspect, the leash module is configured to be removably coupled to a leash assembly via snap-fit engagement of opposed portions of the leash module with the leash assembly.

In a feature of this aspect, the retention opening includes a central bag receipt section and top and bottom bag retention sections.

In a feature of this aspect, the central bag receipt section is generally circular in shape.

In a feature of this aspect, the top and bottom bag retention sections extend generally linearly from the central bag receipt section.

Another aspect of the present invention relates to a leash kit. The leash kit includes a leash assembly comprising a housing and a retractable leash retained within the housing, and a leash module configured to be removably coupled to the leash assembly. The leash module includes a retention opening configured to receive and retain a used pet waste bag that has been closed via a knot, and a bowl portion configured to receive and retain water for drinking by a pet.

In a feature of this aspect, the leash module is configured to be removably coupled to the leash assembly via snap-fit engagement.

In a feature of this aspect, the leash module is configured to be removably coupled to the leash assembly via snap-fit engagement of opposed portions of the leash module with the leash assembly.

In a feature of this aspect, the retention opening includes a central bag receipt section and top and bottom bag retention sections.

In a feature of this aspect, the central bag receipt section is generally circular in shape.

In a feature of this aspect, the top and bottom bag retention sections extend generally linearly from the central bag receipt section.

Another aspect of the present invention relates to a method of disposing of pet waste. The method includes removably coupling a leash module to a leash assembly; walking a dog utilizing the leash assembly; causing pet waste to be contained within a pet waste bag, thereby transitioning the pet waste bag from an unused state to a used state; closing the pet waste bag by tying a knot in the pet waste bag; and retaining the pet waste bag via engagement of the knot with a retention opening of the leash module.

In a feature of this aspect, the step of retaining the pet waste bag comprises inserting the knot within a bag receipt section of the retention opening, and effecting downward movement of the knot such that the knot is retained by a bag retention section of the retention opening.

In a feature of this aspect, the method further comprises steps of decoupling the leash module from the leash assembly, orienting the leash module so that a bowl portion of the leash module is positioned to receive and retain water, causing water to be received and retained within the bowl portion of the leash module, and allowing a pet to drink water from the bowl portion of the leash module.

Another aspect of the present invention relates to a method of disposing of pet waste. The method includes walking a dog utilizing a leash assembly having a leash module removably coupled thereto, decoupling the leash module from the leash assembly, orienting the leash module so that a bowl portion of the leash module is positioned to receive and retain water, causing water to be received and retained within the bowl portion of the leash module, and allowing a pet to drink water from the bowl portion of the leash module. The leash module includes a retention opening configured to retain a used pet waste bag.

In addition to the aforementioned aspects and features of the present invention, it should be noted that the present invention further encompasses the various possible combinations and subcombinations of such aspects and features.

BRIEF DESCRIPTION OF THE DRAWINGS

One or more preferred embodiments of the present invention now will be described in detail with reference to the accompanying drawings, wherein the same elements are referred to with the same reference numerals, and wherein.

DETAILED DESCRIPTION

Figure 1:
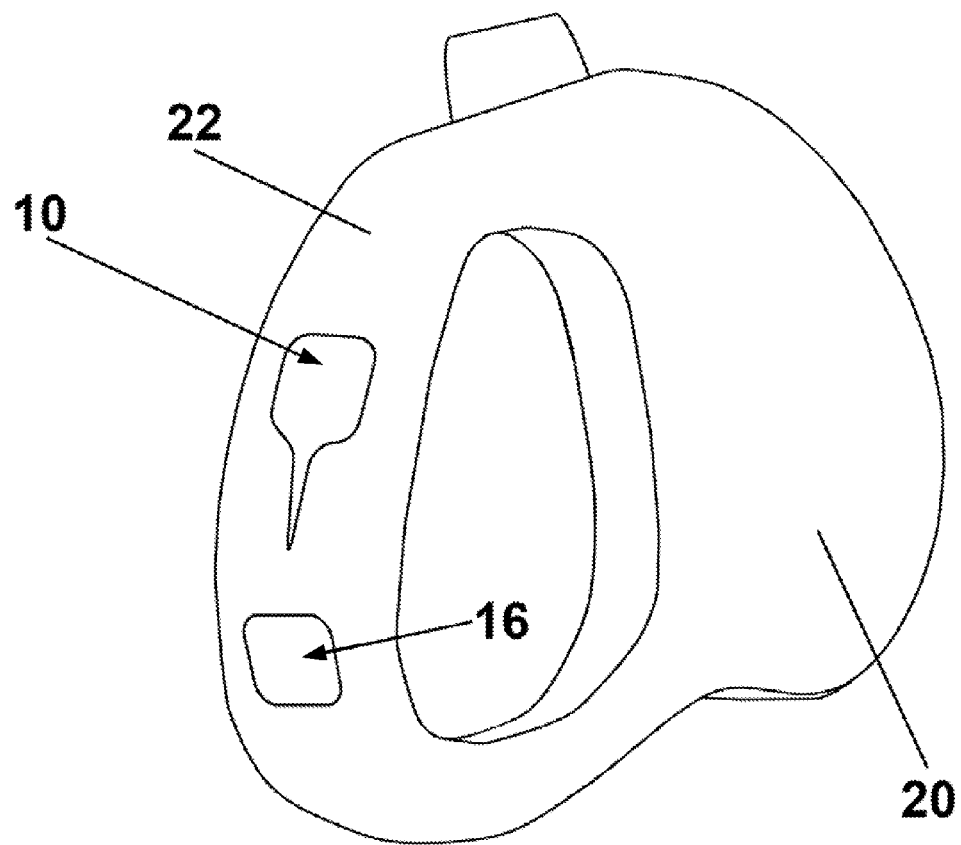
FIG. 1 is a perspective view of a leash assembly in accordance with one or more aspects of the present invention.

As a preliminary matter, it will readily be understood by one having ordinary skill in the relevant art ("Ordinary Artisan") that the present invention has broad utility and application. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. As should be understood, any embodiment may incorporate only one or a plurality of the above-disclosed aspects of the invention and may further incorporate only one or a plurality of the above-disclosed features. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

Regarding applicability of 35 U.S.C. §112, ¶16, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Referring now to the drawings, one or more preferred embodiments of the present invention are next described. The following description of one or more preferred embodiments is merely exemplary in nature and is in no way intended to limit the invention, its implementations, or uses.

Turning now to the figures, FIG. 1 illustrates a leash assembly 20 in accordance with one or more aspects of the present invention. The leash assembly 20 includes a housing having a retractable leash at least partially retained therein, and one or more buttons for operation of the retractable leash assembly.

Figure 2A:
FIG. 2A illustrates an unused pet waste bag in a storage configuration.

The leash assembly 20 preferably further includes a handle portion 22 configured to be gripped by a user. The handle portion 22 preferably includes a dispensing opening 16 configured to allow a user to remove one or more unused pet waste bags 18 therefrom. FIG. 2A illustrates such an unused pet waste bag 18 in a storage configuration.

Figure 3:
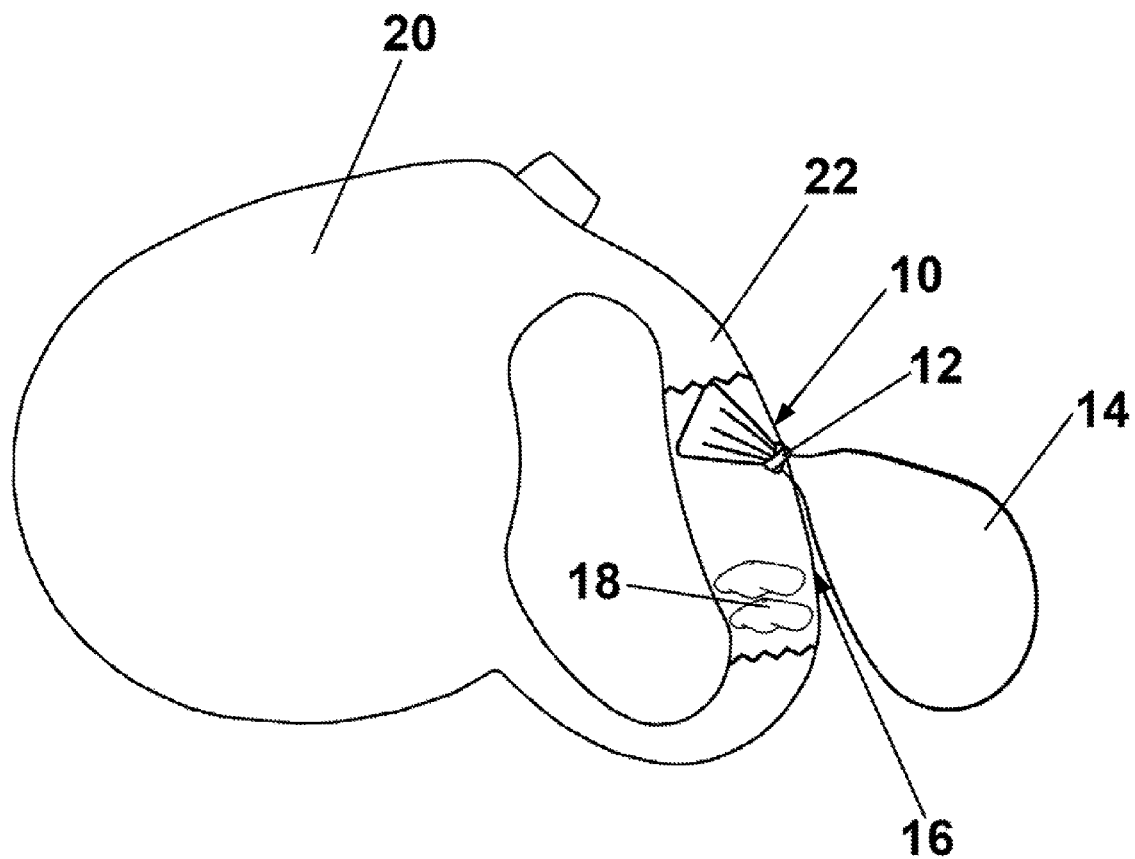
FIG. 3 is a partial cut-away view of the leash assembly of FIG. 1 in which an interior of part of a handle portion is illustrated.

FIG. 3 is a partial cut-away view of the leash assembly 20 in which an interior of part of the handle portion 22 is illustrated. As can be seen in FIG. 3, two unused pet waste bags 18 in a storage configuration are disposed within the handle portion 22. One or more of the unused pet waste bags 18 are preferably accessible to a user via the dispensing opening 16. In some preferred implementations, the dispensing opening 16 is configured to allow access to only one unused pet waste bag 18 at a time. Further, in some preferred implementations, unused pet waste bags 18 may be inserted via the dispensing opening. Alternatively or additionally, in some preferred implementations, unused pet waste bags 18 may be inserted via a retention opening (described hereinbelow).

Figure 2B:
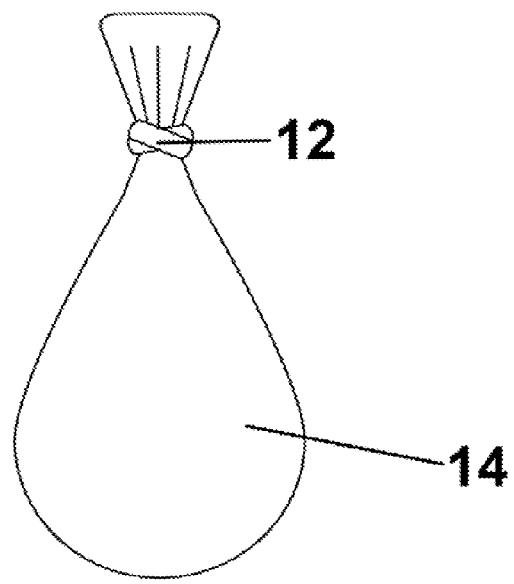
FIG. 2B illustrates a used pet waste bag having pet waste contained therein that is closed with a knot.

In a preferred method of use, a user removes an unused pet waste bag 18 via the dispensing opening 16, opens it for use by transitioning it from a storage configuration to a use configuration, and then causes it to contain pet waste, e.g. by picking up pet waste using the pet waste bag 18. After pet waste is contained therein, a knot is preferably tied in the top of the pet waste bag to close the pet waste bag, although in at least some alternative implementations a pet waste bag may be closed in another manner. FIG. 2B illustrates a used pet waste bag 14 that contains pet waste therein that has been closed via such a knot 12.

The handle portion 22 preferably further includes a retention opening 10 configured to receive and retain such a used pet waste bag 14 that has been closed via a knot 12. The retention opening 10 preferably includes a top bag receipt section and a bottom bag retention section. The top bag receipt section preferably is generally rectangular in shape, while the bottom bag retention section preferably is tapered from where it meets the top bag receipt section down to a point.

In a preferred method of use, a user inserts the knot 12 of a used pet waste bag 14 into the bag receipt section of the retention opening 10 and then slides the used pet waste bag 14 downward so as to retain the used pet waste bag 14 via the bottom bag retention section of the retention opening 10.

Figure 4:
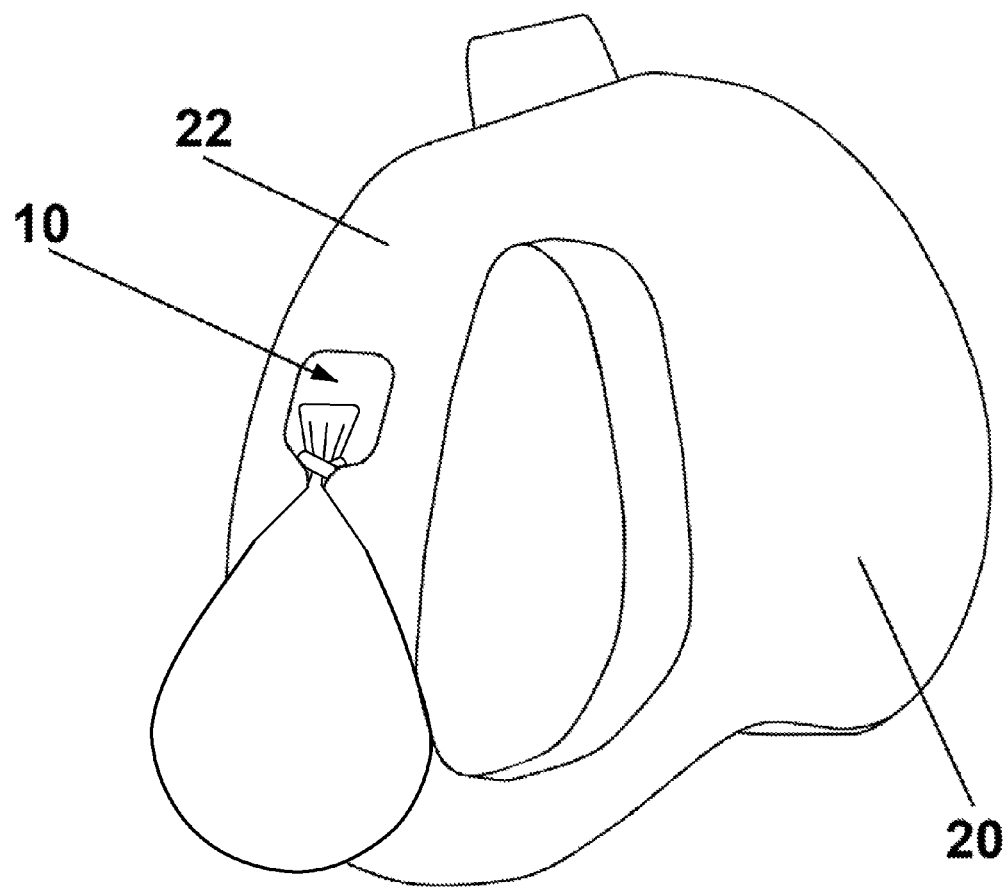
FIG. 4 illustrates retention of a pet waste bag in a retention opening of a leash assembly.

FIG. 4 illustrates retention of a pet waste bag in a retention opening of a leash assembly. As illustrated in FIG. 4, a knot formed in the pet waste bag is too wide to pass through the bottom bag retention section which retains it, thereby preventing the pet waste bag from pulling loose from the leash assembly 20.

Although the leash assembly 20 of FIG. 1 is illustrated as including both a dispensing opening 16 and a retention opening 10, in at least some preferred implementations, a leash assembly includes only a retention opening, while in at least some other preferred implementations, a leash assembly includes only a dispensing opening.

It will be appreciated some preferred leash assemblies described hereinabove include a retention opening defined in a housing of a retractable pet leash. In at least some preferred implementations, however, such a retention opening is defined in the band of a pet leash, for example, in the woven band of a nylon pet leash.

Figure 5:
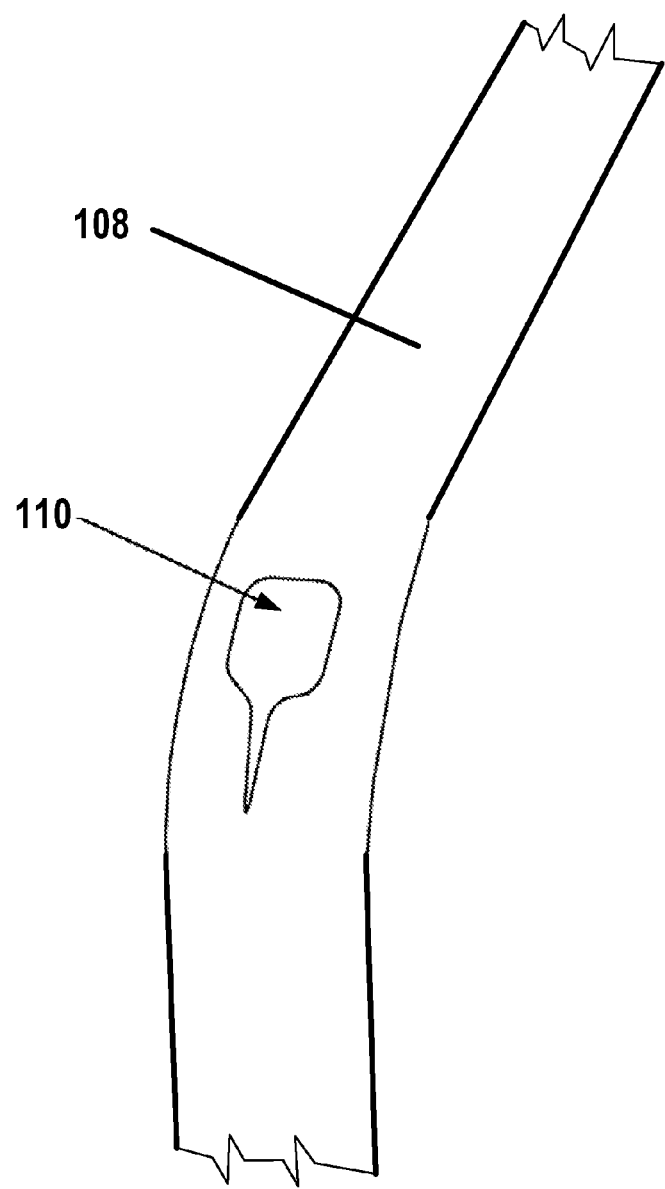
FIG. 5 is a partial, fragmented view of a leash assembly in accordance with one or more aspects of the present invention.

FIG. 5 is a partial, fragmented view of an alternative leash assembly 120 in accordance with one or more aspects of the present invention. The leash assembly 120 comprises a pet leash band 108, a connection mechanism at one end thereof (not illustrated) for securement to a collar of a pet, and a retention opening 110 defined therethrough. Like the retention opening 10 of the leash assembly 20, the retention opening 110 preferably includes a bag receipt section and a bag retention section, as illustrated in FIG. 5. Preferably, the bag retention section is closer to the connection mechanism than the bag receipt section is, although in at least some preferred implementations the bag receipt section is closer to the connection mechanism than the bag retention section is.

In a preferred method of use, a leash assembly 120 is angled relative to the ground at an acute angle (i.e. an angle between 0 degrees and 90 degrees), the knot of a used pet waste bag 14 is pulled upward through the bag receipt section of the retention opening 110 of the leash assembly 120, and then pushed generally forward so that the bag 14 engages the bag retention section of the retention opening 110. While being pushed forward, or thereafter, the bag 14 may be adjusted downwards so that the knot 12 rests upon a top of the pet leash band 108 (adjacent the retention section of the retention opening 110).

Figure 6:
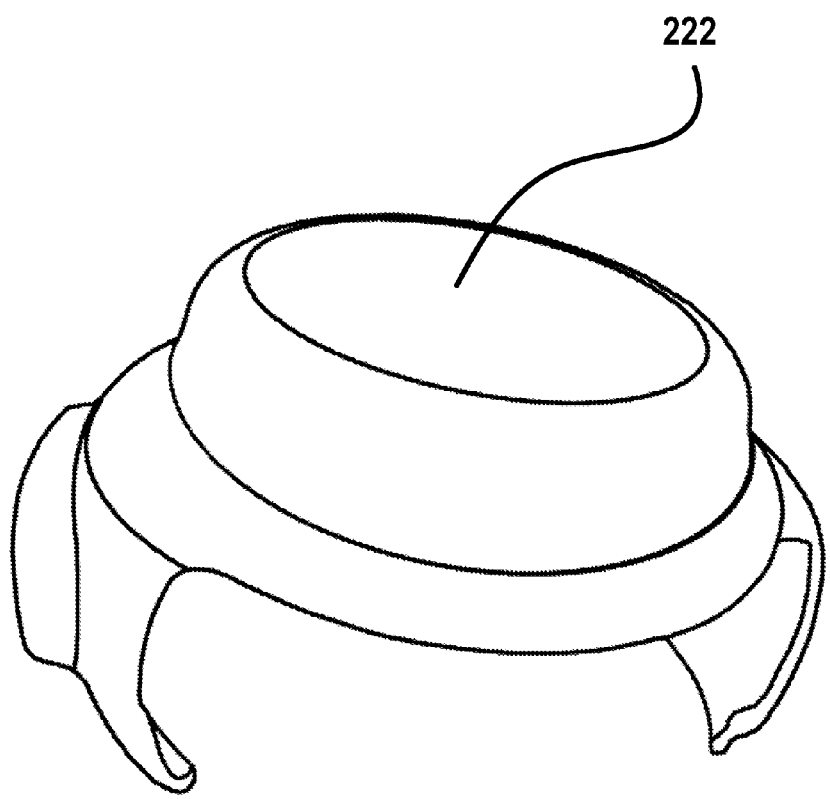
FIG. 6 is a perspective view of a leash module in accordance with one or more aspects of the present invention.
Figure 7:
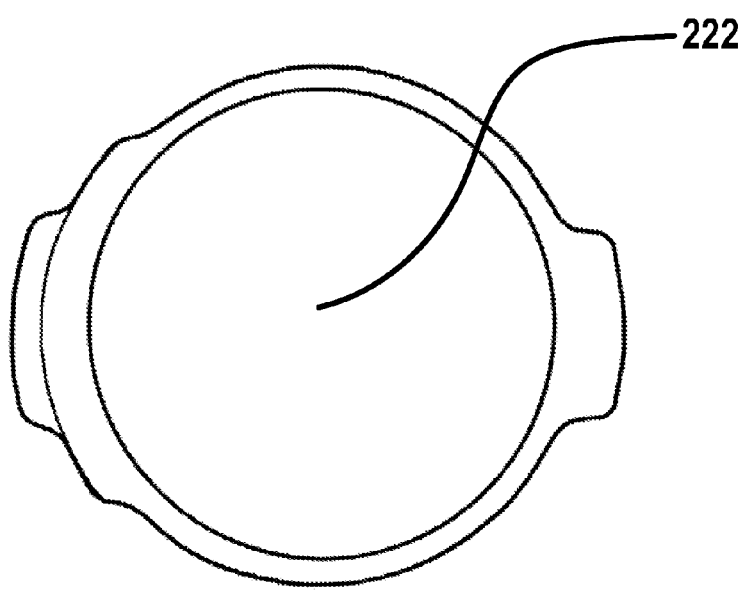
FIGS. 7 and 8 are bottom and top views, respectively, of the leash module of FIG. 6.
Figure 8:
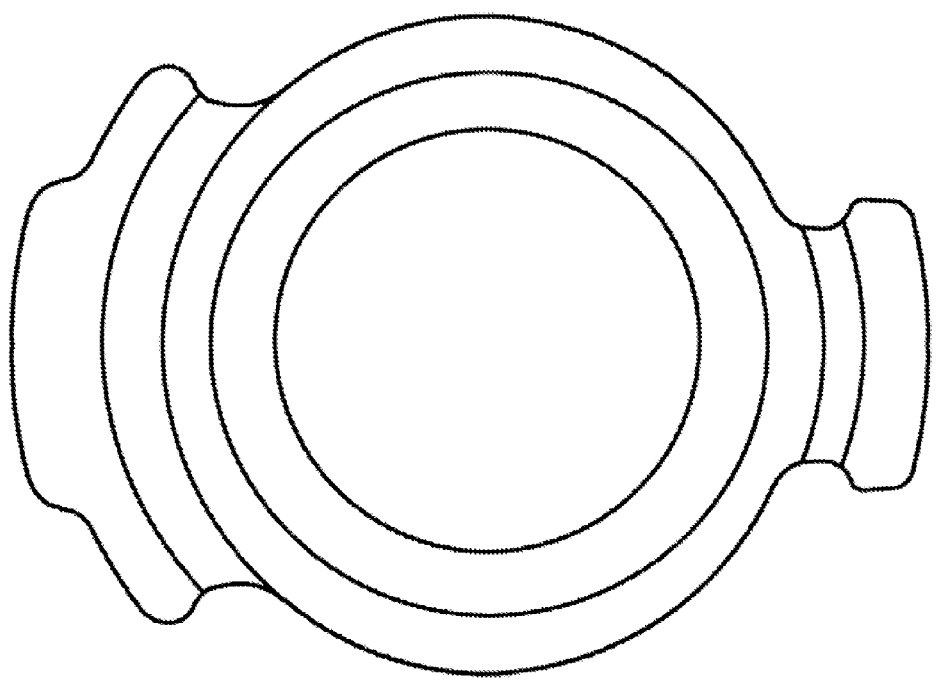

FIG. 6 is a perspective view of a leash module 220 in accordance with one or more aspects of the present invention, and FIGS. 7 and 8 are bottom and top views, respectively, of the leash module 220. In FIG. 6, the exterior face of a bottom panel 222 of the leash module 220 is facing up.

Figure 9:
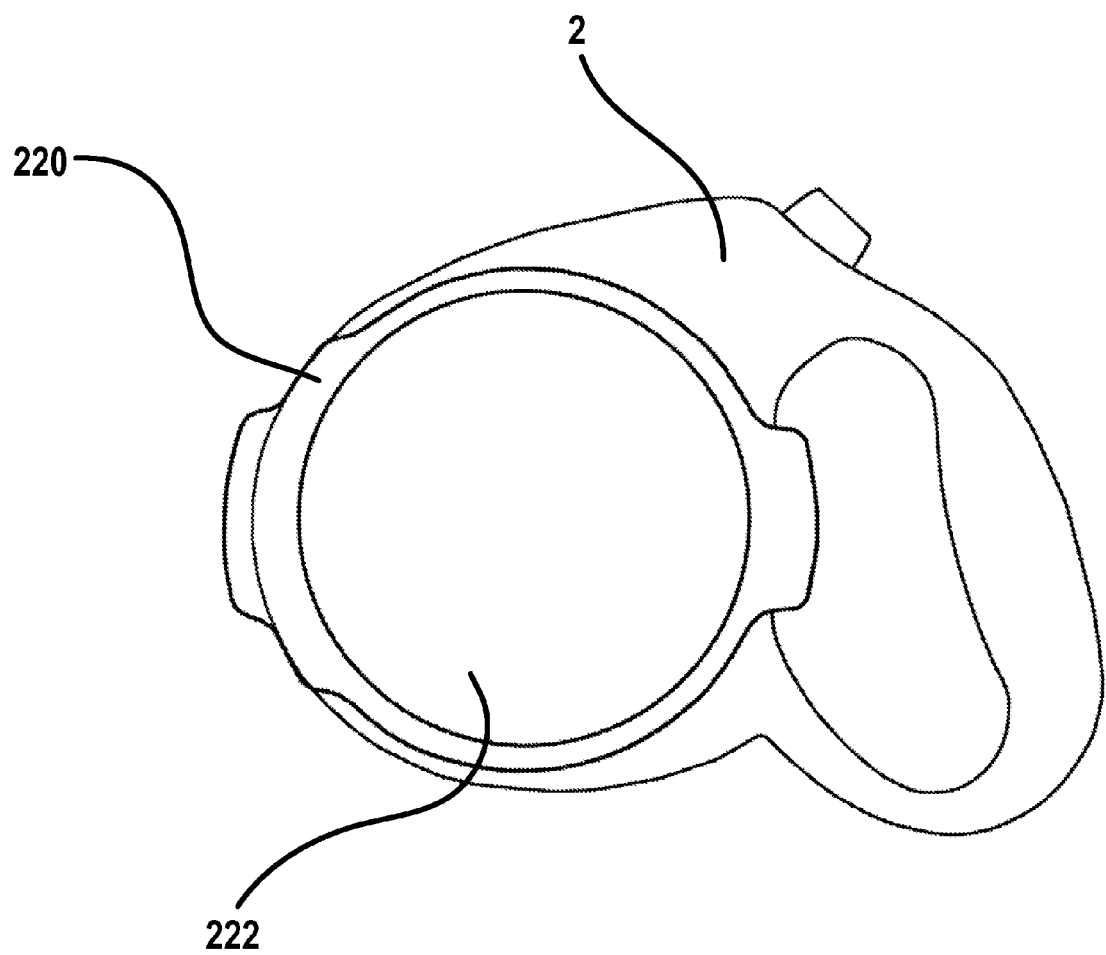
FIG. 9 is a first side view of a leash assembly having a leash module coupled thereto.
Figure 10:
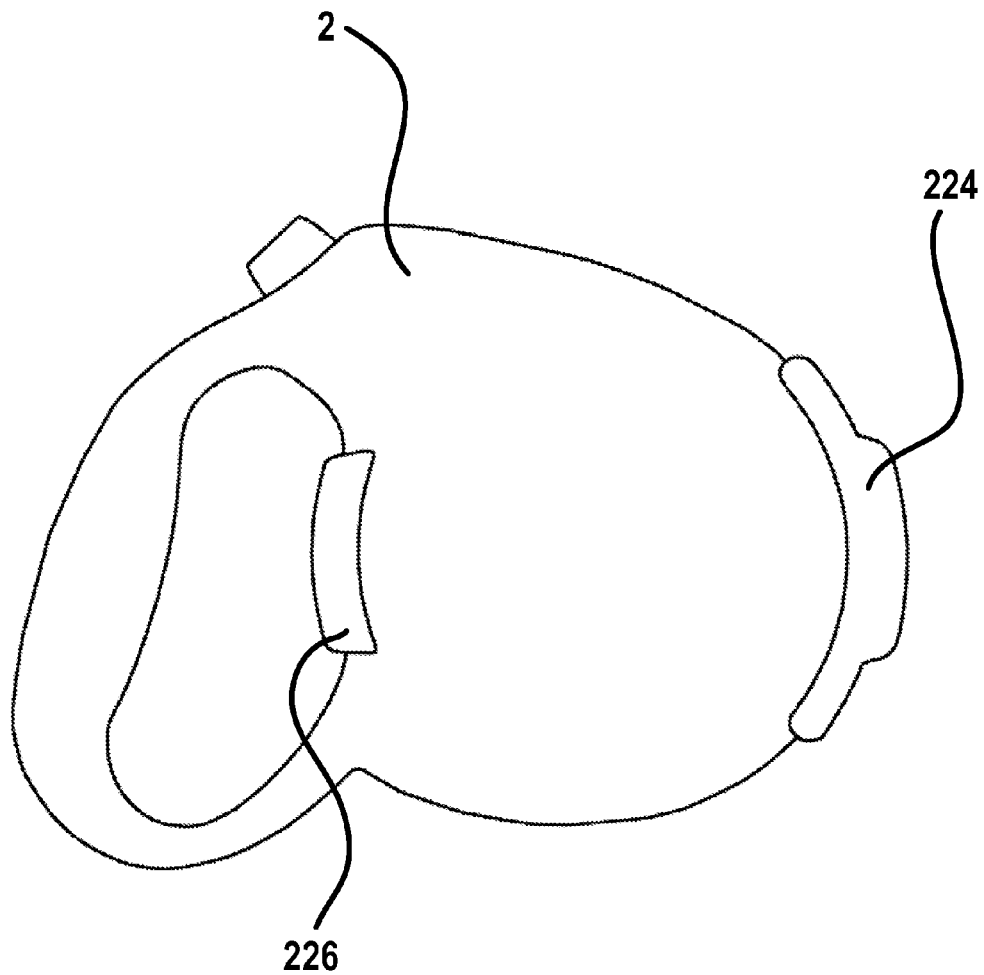
FIG. 10 is an opposite side view of the leash assembly and leash module of FIG. 9.

The leash module 220 is configured to be removably coupled to a leash assembly 2, as illustrated in FIGS. 9-10. The leash assembly 2 may be similar or identical to the leash assembly 20 described hereinabove, or, alternatively, may be a conventional, commercially available leash assembly.

Figure 11:
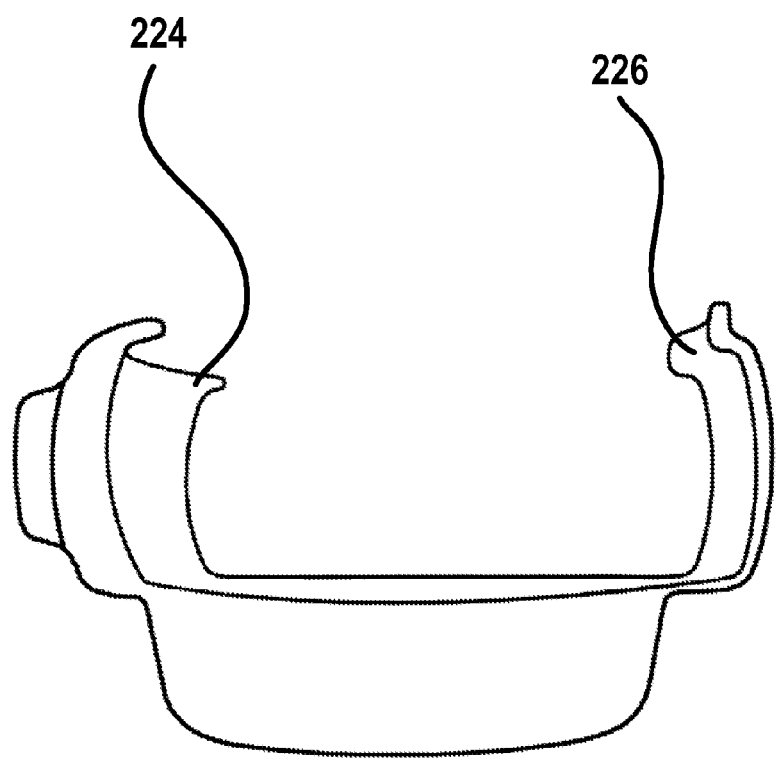
FIG. 11 is a side view of the leash module of FIG. 6.

FIG. 9 is a first side view of the leash assembly 2 with the leash module 220 coupled thereto in which the exterior face of the bottom panel 222 of the leash module 220 is visible, and FIG. 10 is an opposite side view of the leash assembly 2 with the leash module 220 coupled thereto. The leash module 220 is coupled to the leash assembly 2 via snap-fit engagement of opposed portions 224,226 of the leash module 220 with the leash assembly 2. These opposed portions 224,226 are perhaps best illustrated in FIG. 11, which is a side view of the leash module 220.

Figure 12:
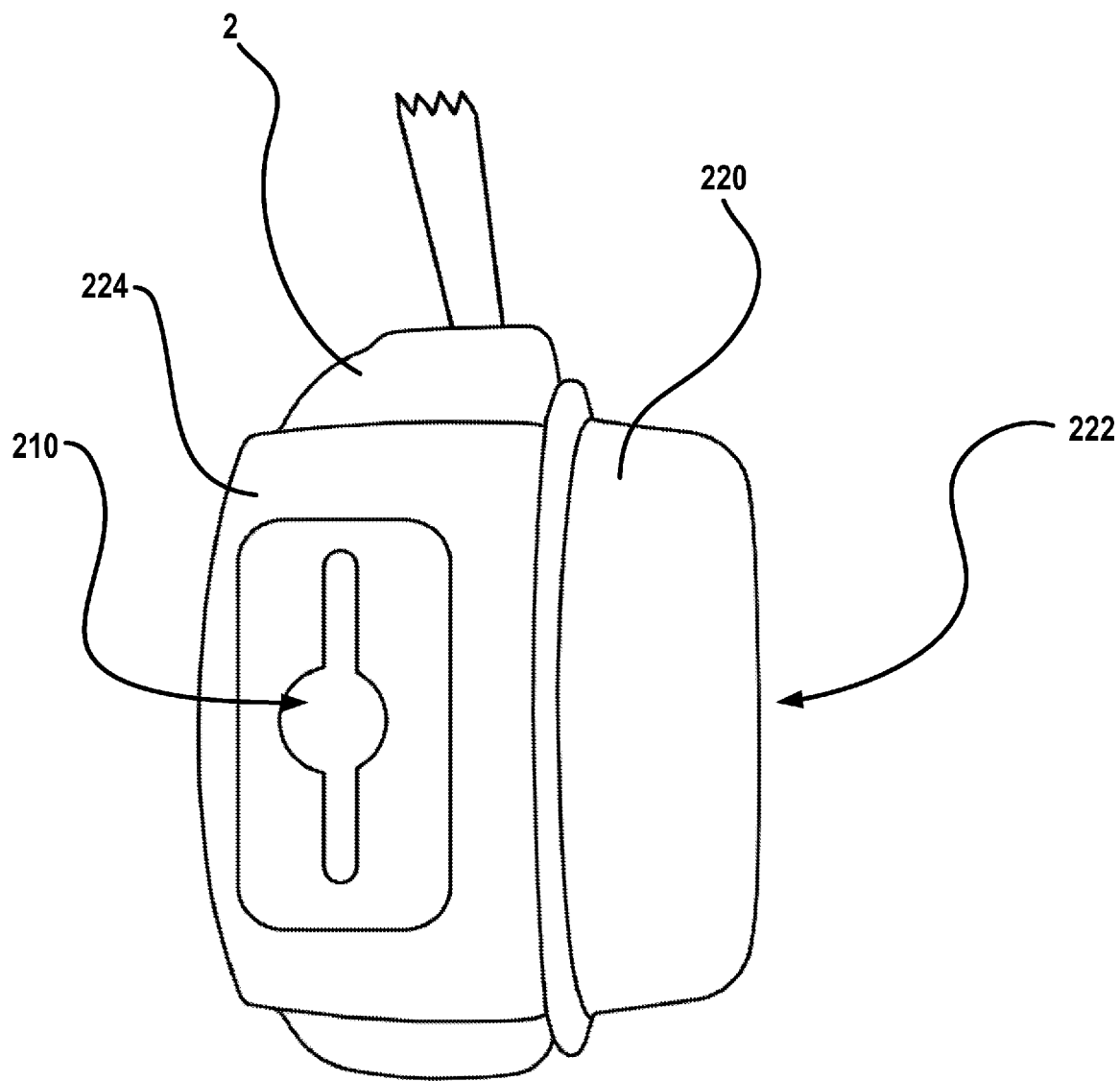
FIG. 12 illustrates a retention opening of the leash module of FIG. 6.

The leash module 220 preferably includes a retention opening 210 defined through portion 224, as illustrated in FIG. 12. The retention opening 210 is preferably configured to receive and retain a used pet waste bag that has been closed via a knot. The retention opening 210 preferably includes a central bag receipt section and top and bottom bag retention sections, as illustrated in FIG. 12. The central bag receipt section preferably is generally circular in shape, and the top and bottom bag retention sections preferably extend therefrom generally linearly.

In a preferred method of use, a user inserts the knot of a used pet waste bag into the bag receipt section of the retention opening 210 and then slides the used pet waste bag downward so as to retain the used pet waste bag via the bottom bag retention section of the retention opening 210.

Figure 13:
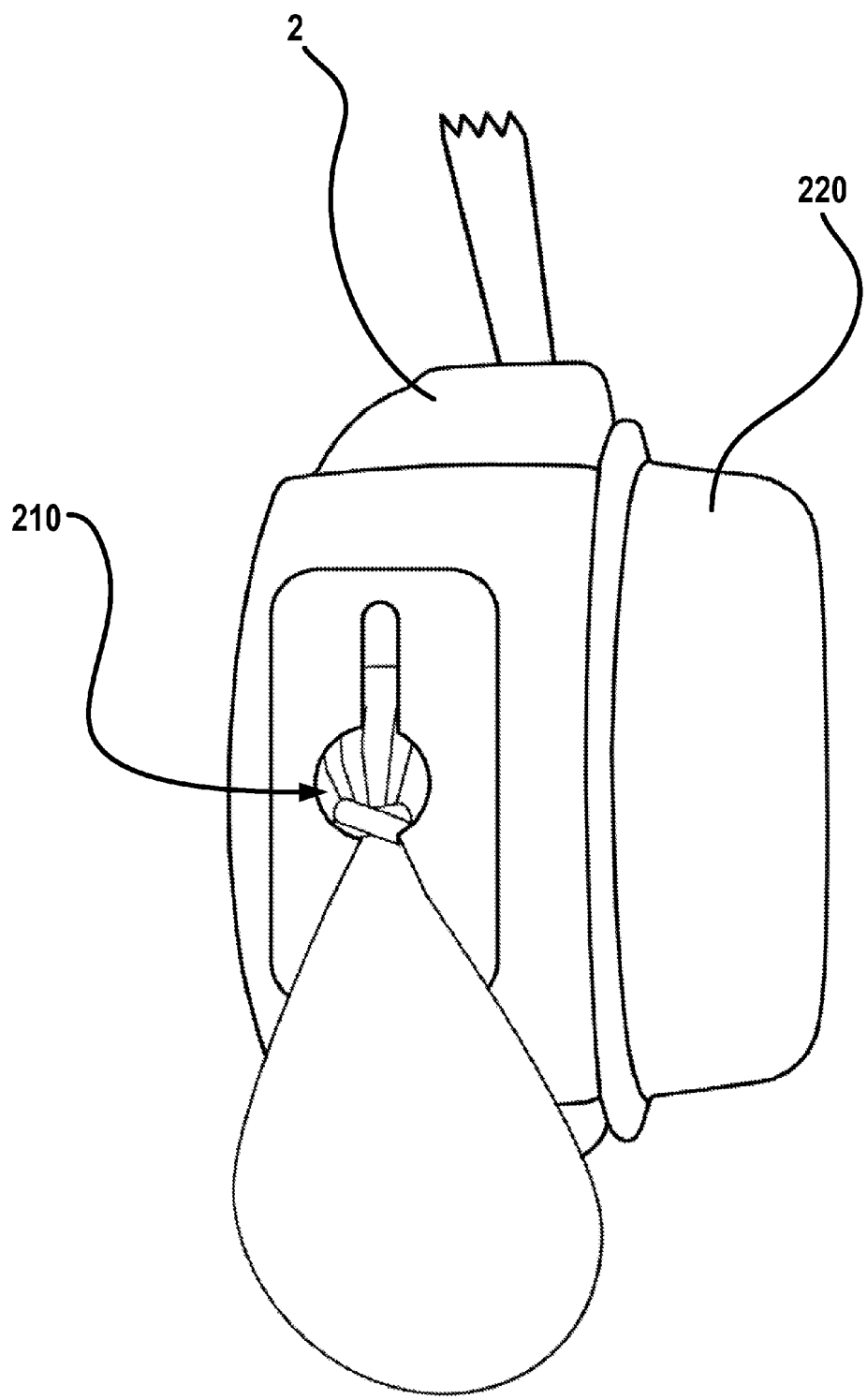
FIGS. 13-15 illustrate retention of a pet waste bag in the retention opening of the leash module of FIG. 6 when it coupled to a leash assembly.
Figure 14:
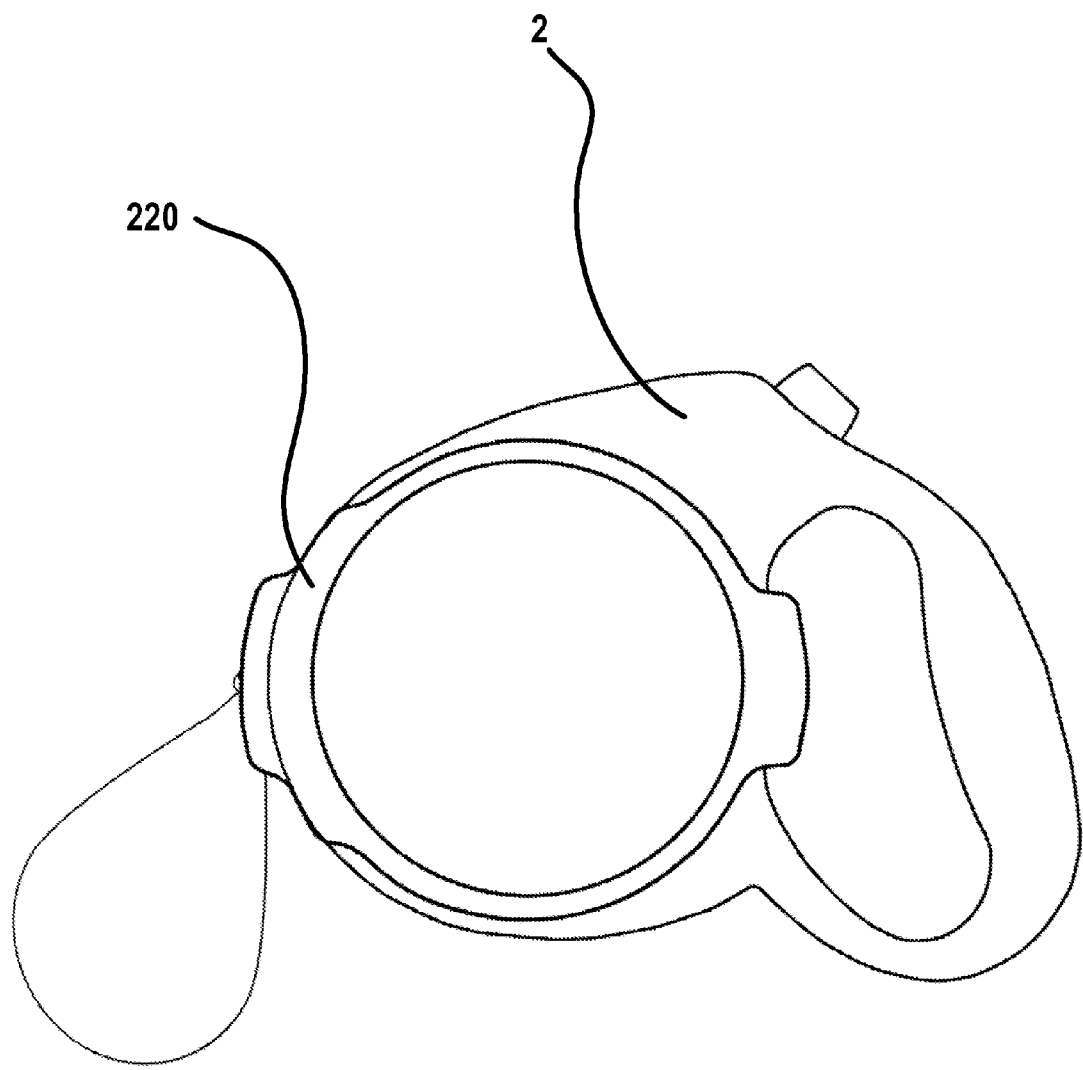
Figure 15:
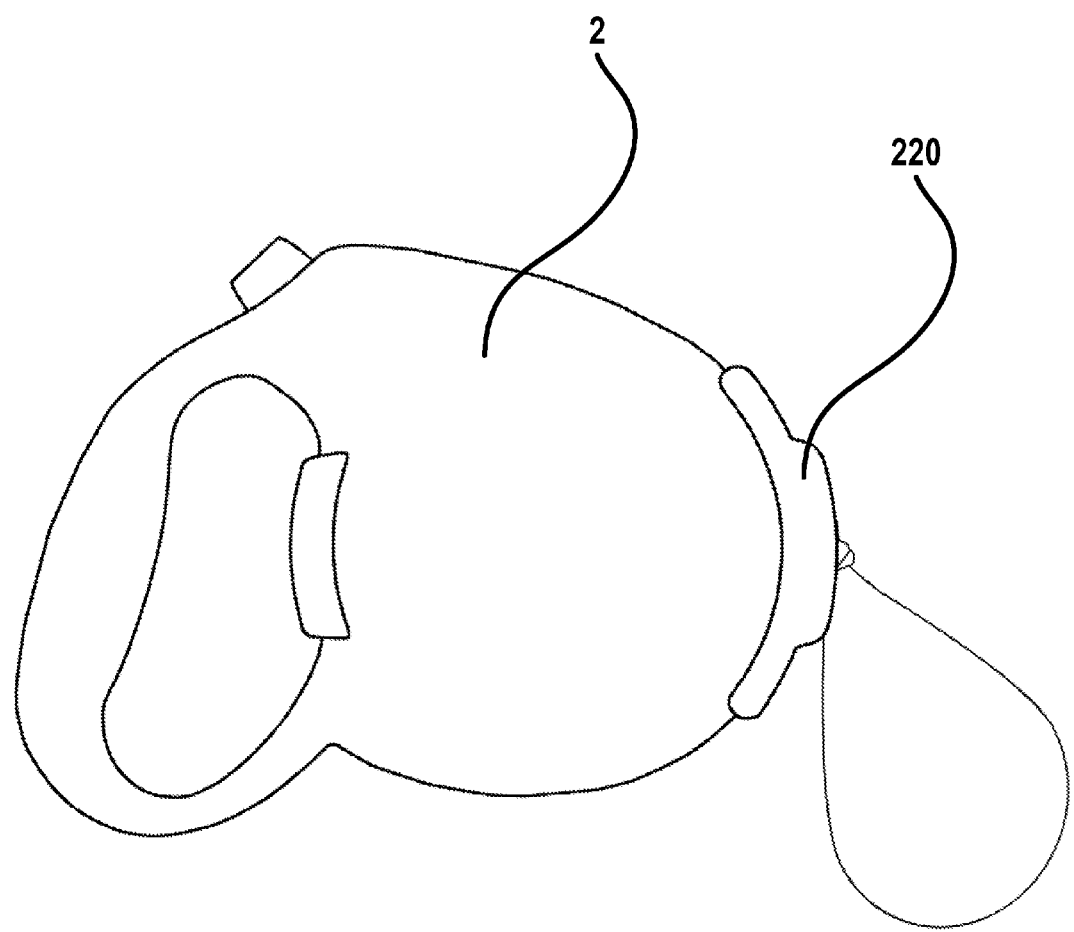
Figure 16:
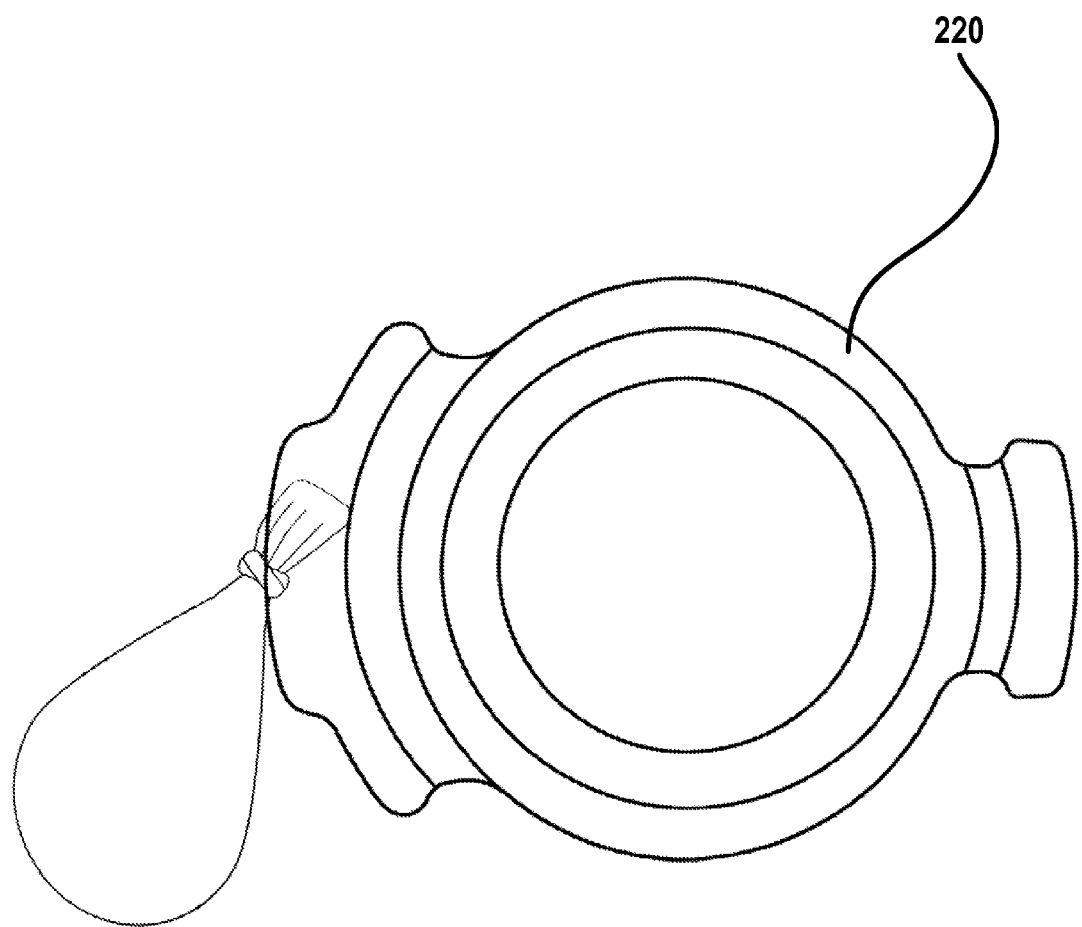
FIG. 16 illustrates retention of a pet waste bag in the retention opening of the leash module of FIG. 6 when it is separate from a leash assembly.

FIGS. 13-15 illustrate retention of a pet waste bag in the retention opening 210 of the leash module 220 when it is coupled to the leash assembly 2. As illustrated in FIG. 13, a knot formed in the pet waste bag is too wide to pass through the bottom bag retention section which retains it, thereby preventing the pet waste bag from pulling loose from the leash module 220. FIG. 16 illustrates retention of a pet waste bag in the retention opening 210 of the leash module 220 after it is separated from the leash assembly 2.

Figure 17:
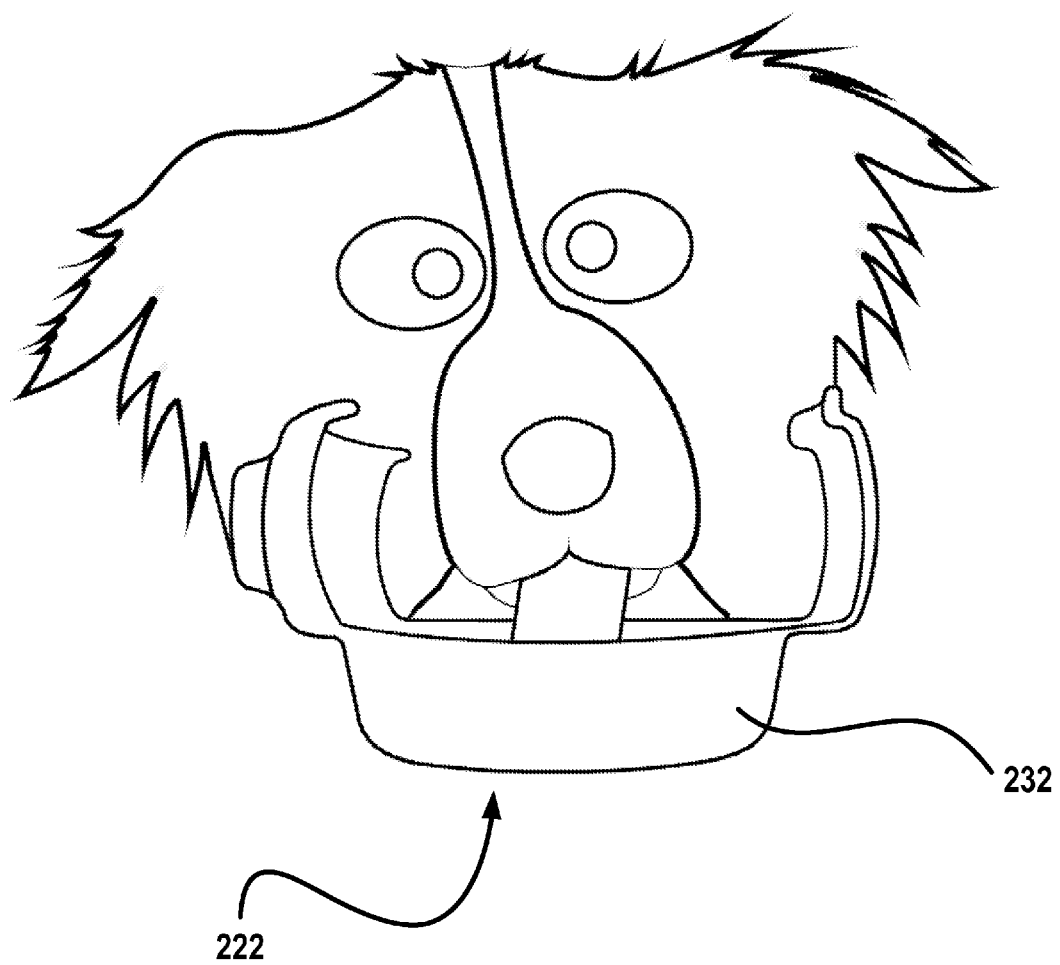
FIG. 17 illustrates use of the leash module of FIG. 6 as a water bowl for a pet.

The leash module 220 is further configured such that, when it is separated from the leash assembly 2, it can be utilized as a water bowl for a pet, as illustrated in FIG. 17. Specifically, the leash module 220 preferably includes a bowl portion 232 having a bottom defined by an interior face of the bottom panel 222 of the leash module 220. In user, a user preferably decouples the leash module 220 from a leash assembly 2, orients the leash module 220 so as to allow water to be poured into the bowl portion 232, e.g. by orienting the leash module 220 such that the exterior face of the bottom panel 222 is facing generally downwards and the interior face is facing generally upwards, and then pours water into the bowl portion 232.

Based on the foregoing description, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention. Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements, the present invention being limited only by the claims appended hereto and the equivalents thereof.

What is claimed is:

1. A pet water bowl leash module comprising:
   (a) a retention opening configured to receive and retain a used pet waste bag that has been closed via a tied knot, the retention opening including
      (i) a bag receipt opening sized and dimensioned to allow for insertion of the tied knot of the used pet waste bag, and
      (ii) a bag retention opening extending from the bag receipt opening, the bag retention opening being narrower than the bag receipt opening and being sized and dimensioned to prevent passage of the tied knot of the used pet waste bag,
      (iii) wherein the bag receipt opening and the bag retention opening are collectively configured for insertion of the tied knot of the used pet waste bag through the bag receipt opening of the retention opening and securement of such inserted pet waste bag via sliding of the tied knot behind the bag retention opening, the bag retention opening being configured to prevent removal of the tied knot until the tied knot is slid to the bag receipt opening;
   (b) a bowl portion configured to receive and retain water for drinking by a pet;
   (c) wherein the pet water bowl leash module is removably coupled to a leash assembly via snap-fit engagement.

2. The leash module of claim 1, wherein the leash module is configured to be removably coupled to a leash assembly via snap-fit engagement of opposed portions of the leash module with the leash assembly.

3. A pet water bowl leash module comprising:
   (a) a retention opening configured to receive and retain a used pet waste bag that has been closed via a tied knot, the retention opening including
      (i) a bag receipt opening sized and dimensioned to allow for insertion of the tied knot of the used pet waste bag, and
      (ii) a bag retention opening extending from the bag receipt opening, the bag retention opening being narrower than the bag receipt opening and being sized and dimensioned to prevent passage of the tied knot of the used pet waste bag,
      (iii) wherein the bag receipt opening and the bag retention opening are collectively configured for insertion of the tied knot of the used pet waste bag through the bag receipt opening of the retention opening and securement of such inserted pet waste bag via sliding of the tied knot behind the bag retention opening, the bag retention opening being configured to prevent removal of the tied knot until the tied knot is slid to the bag receipt opening;
   (b) a bowl portion configured to receive and retain water for drinking by a pet;
   (c) wherein the pet water bowl leash module is configured to be removably coupled to a leash assembly;
   (d) wherein the bag receipt opening of the retention opening is a central bag receipt section, and the bag retention opening is one of two top and bottom bag retention sections.

4. The leash module of claim 3, wherein the central bag receipt section is generally circular in shape.

5. The leash module of claim 4, wherein the top and bottom bag retention sections extend generally linearly from the central bag receipt section.

6. A pet water bowl leash module comprising:
   (a) a retention opening configured to receive and retain a used pet waste bag that has been closed via a tied knot, the retention opening including
      (i) a bag receipt opening sized and dimensioned to allow for insertion of the tied knot of the pet waste bag, and
      (ii) a bag retention opening extending from the bag receipt opening, the bag retention opening being narrower than the bag receipt opening and being sized and dimensioned to prevent passage of the tied knot of the used pet waste bag,
      (iii) wherein the bag receipt opening and bag retention opening are collectively configured for insertion of the tied knot of the used pet waste bag through the bag receipt opening of the retention opening and securement of such inserted pet waste bag via sliding of the tied knot behind the bag retention opening, the bag retention opening being configured to prevent removal of the tied knot until the tied knot is slid to the bag receipt opening;
   (b) a bowl portion configured to receive and retain water for drinking by a pet;
   (c) wherein the pet water bowl leash module is removably coupled to a leash assembly, the leash assembly comprising a housing and a retractable leash retained within the housing.

7. The pet water bowl leash module of claim 6, wherein the leash module is removably coupled to the leash assembly via snap-fit engagement with the leash assembly.

8. The pet water bowl leash module of claim 6, wherein the leash module is removably coupled to the leash assembly via snap-fit engagement of opposed portions of the leash module with the leash assembly.

9. The pet water bowl leash module of claim 6, wherein the bag receipt opening of the retention opening is a central bag receipt section, and the bag retention opening is one of two top and bottom bag retention sections.

10. The pet water bowl leash module of claim 9, wherein the central bag receipt section is generally circular in shape.

11. The pet water bowl leash module of claim 10, wherein the top and bottom bag retention sections extend generally linearly from the central bag receipt section.

12. A leash module configured for facilitating provision of water to a pet during a walk utilizing a retractable leash assembly, the leash module comprising:
   (a) a bowl portion configured to receive and retain water for drinking by a pet, the bowl portion including a base and walls extending therefrom to form a bowl configured to receive and retain liquid when the base of the bowl is facing generally downward with the walls extending upwardly therefrom; and (b) first and second opposed engagement portions extending from the bowl portion, the opposed engagement portions being sized and dimensioned to correspond to outer surfaces of the leash assembly such that the opposed engagement portions are configured to removably secure the leash module about the leash assembly via snap-fit engagement such that the bowl portion of the leash module is disposed adjacent a side of the leash assembly;

(c) wherein the first opposed engagement portion includes a retention opening defined therein, the retention opening being configured to receive and retain a used pet waste bag that has been closed via a tied knot, the retention opening including (i) a bag receipt opening sized and dimensioned to allow for insertion of the tied knot of the pet waste bag, and (ii) a bag retention opening extending from the bag receipt opening, the bag retention opening being narrower than the bag receipt opening and being sized and dimensioned to prevent passage of the tied knot of the pet waste bag, (iii) wherein the bag receipt opening and bag retention opening are collectively configured for insertion of the tied knot of the pet waste bag through the bag receipt opening of the retention opening and securement of such inserted pet waste bag via sliding of the tied knot behind the bag retention opening, the bag retention opening being configured to prevent removal of the tied knot until the tied knot is slid to the bag receipt opening; and (d) wherein the leash module is configured for transitioning between a first configuration in which the leash module is removably secured to the leash assembly such that an interior of the bowl of the leash module is generally not exposed, and a second configuration in which the leash module is not secured to the leash assembly and is disposed on the ground with water in the bowl so as to allow a pet to drink therefrom.

13. The leash module of claim 12, wherein each opposed engagement portion includes an engagement lip disposed near a top thereof configured to secure the leash module to the leash assembly.

14. The leash module of claim 12, wherein the leash module is sized and dimensioned to correspond to a leash assembly.

15. The leash module of claim 12, wherein the bowl portion comprises a generally circular base and a generally cylindrical sidewall extending upwardly therefrom.

16. The leash module of claim 12, wherein the leash module is removably secured about the leash assembly via snap-fit engagement such that the bowl portion of the leash module is disposed adjacent a side of the leash assembly.

17. The leash module of claim 12, wherein the bag receipt opening of the retention opening is a central bag receipt section, and the bag retention opening is one of two top and bottom bag retention sections.

18. The leash module of claim 17, wherein the central bag receipt section is generally circular in shape.

19. The leash module of claim 18, wherein the top and bottom bag retention sections extend generally linearly from the central bag receipt section.

\* \* \* \* \*